United States Patent
Suzuki et al.

(10) Patent No.: US 6,775,478 B2
(45) Date of Patent: Aug. 10, 2004

(54) OPTICAL TDM MULTIPLEXER, OPTICAL TDM DEMULTIPLEXER, WDM/TDM CONVERTER AND TDM/WDM CONVERTER

(75) Inventors: Masatoshi Suzuki, Kamifukuoka (JP); Noboru Edagawa, Kamifukuoka (JP)

(73) Assignees: DDI Corporation, Tokyo (JP); KDD Submarine Cable Systems Inc., Tokyo (JP)

( * ) Notice: Subject to any disclaimer, the term of this patent is extended or adjusted under 35 U.S.C. 154(b) by 542 days.

(21) Appl. No.: 09/816,630

(22) Filed: Mar. 23, 2001

(65) Prior Publication Data

US 2002/0126346 A1 Sep. 12, 2002

(30) Foreign Application Priority Data

Mar. 24, 2000 (JP) ........................................ 2000-083997

(51) Int. Cl.[7] .................. H04J 4/00; H04J 14/00; H04J 14/02; H04J 14/08; H04B 10/00
(52) U.S. Cl. .................. 398/75; 398/53; 398/91; 398/98; 398/102; 398/161
(58) Field of Search .................. 398/82, 85, 75, 398/102, 161, 91, 98, 47, 53

(56) References Cited

U.S. PATENT DOCUMENTS

| | | | |
|---|---|---|---|
| 5,005,166 A | * 4/1991 | Suzuki et al. | 398/47 |
| 5,319,484 A | * 6/1994 | Jacob et al. | 398/75 |
| 5,896,212 A | * 4/1999 | Sotom et al. | 398/55 |
| 5,953,142 A | 9/1999 | Chiaroni et al. | |
| 5,959,764 A | * 9/1999 | Edagawa et al. | 359/326 |
| 6,307,658 B1 | 10/2001 | Chiaroni et al. | |
| 6,532,091 B1 | * 3/2003 | Miyazaki et al. | 398/175 |

FOREIGN PATENT DOCUMENTS

| | | |
|---|---|---|
| EP | 0 828 174 A2 | 3/1998 |
| EP | 0 835 035 A1 | 4/1998 |
| EP | 0 876 020 A1 | 11/1998 |
| EP | 1 130 456 A2 | 9/2001 |
| JP | 8-163096 | 6/1996 |
| JP | 8-195732 | 7/1996 |

OTHER PUBLICATIONS

European Search Report of corresponding European Patent Application.
Patent Abstract of Japan, Publication Number 08163096, Published on Jun. 21, 1996, in the name of Nippon Telegr & Teleph Corp.
Patent Abstract of Japan, Publication Number 08195732, Published on Jul. 30, 1996, in the name of Nippon Telegr & Teleph Corp.

* cited by examiner

*Primary Examiner*—Leslie Pascal
*Assistant Examiner*—Dalzid Singh
(74) *Attorney, Agent, or Firm*—Christie, Parker & Hale, LLP

(57) ABSTRACT

An optical TDM multiplexing apparatus to multiplex a plurality of input signals in the optical stage in the time domain according to the invention comprise a plurality of signal light sources to generate optical signals each having a wavelength different from the others to carry each of the plurality of the input signals, a timing adjuster to adjust timings between the respective optical signals so that each optical signal output from the plurality of the signal light sources is disposed on a time slot different from the others in the time domain, an optical multiplexer to multiplex each optical signal output from the timing adjuster in the wavelength domain and a wavelength converter to convert each wavelength of the output light from the optical multiplexer into a predetermined wavelength.

44 Claims, 7 Drawing Sheets

OPTICAL TDM MULTIPLEXER, OPTICAL TDM DEMULTIPLEXER, WDM/TDM CONVERTER AND TDM/WDM CONVERTER

CROSS-REFERENCE TO RELATED APPLICATION

This application claims priority of Japanese patent application number 2000-083997, filed Mar. 24, 2000.

FIELD OF THE INVENTION

This invention relates to an optical TDM multiplexer to multiplex a plurality of signals in the optical stage in the time domain and an optical TDM demultiplexer to demultiplex time-division-multiplexed (TDM) signals in the optical stage.

This invention also relates to a WDM/TDM converter to convert an optical WDM signal into an optical TDM signal and a TDM/WDM converter to convert an optical TDM signal into an optical WDM signal.

BACKGROUND OF THE INVENTION

In optical fiber communication, a transmission rate has increased from 10 Gb/s to 20 Gb/s and 40 Gb/s. To cope with such increase of the transmission rate, it requires a device to time-division-multiplex a plurality of signals of 10 Gb/s, and conversely a device to demultiplex a time-division-multiplexed signal into individual signals. It is possible to consider the multiplexing/demultiplexing in both electric and optical stages. However, since the electric performance is limited, the multiplexing/demultiplexing in the optical stage is more desirable.

For instance, an optical time division multiplexing system is well known that multiplexes optical short pulses with a sufficiently narrow optical pulse width in the optical time domain. To demultiplex a TDM signal in the optical stage, an optical circuit is necessary to logically perform AND operation of a high-speed optical signal and a low-speed short pulse. Representative examples of such AND circuit are a nonlinear loop mirror and an element using four-wave mixing of an optical fiber.

With regard to the multiplexing, there are problems as follows. That is, to multiplex signals of 10 Gb/s in the electric domain in the time domain, a high-speed electronic circuit is required. In addition, an optical modulator to convert an electric signal into an optical signal generally needs a large driving voltage proportional to an increase of the operation rate while an output voltage of the electronic circuit decreases as the operation rate becomes faster. Accordingly, it is impossible to obtain desired characteristics of such as an extinction ratio using a conventional system that drives an optical modulator with a multiplexed signal obtained through the time-division-multiplexing in the electric domain.

In addition, in a conventional optical time division multiplexing system to multiplex optical short pulses with sufficiently narrow optical pulse width in the optical time domain, there are strict requirements such as the extinction ratio of each low-speed signal is sufficiently high and the pulse width of each optical pulse is sufficiently narrow in order to avoid noise caused by interference between adjacent pulses. For instance, when four low-speed signals at 10 Gb/s are multiplexed, the pulse width of each 10 Gb/s signal has to be no more than 1/5 to 1/4 of an objective 40 Gb/s bit time slot (25 ps), namely 5 ps to 6 ps. To realize the above condition, a large and high priced short pulse light source is required and thus the cost is greatly increased.

Meanwhile, the existing optical AND circuit cannot perform the demultiplexing stably either since it is sensitive to a polarization fluctuation and a temperature fluctuation.

SUMMARY OF THE INVENTION

It is therefore an object of the present invention to provide an optical TDM multiplexer, an optical TDM demultiplexer, a WDM/TDM converter and a TDM/WDM converter to have superior characteristics to those of prior art.

Another object of the present invention is to provide an optical TDM multiplexer, an optical TDM demultiplexer, a WDM/TDM converter and a TDM/WDM converter to operate in stable condition and to be realized low-priced.

Further object of the present invention is to provide an optical TDM multiplexer, an optical TDM demultiplexer, a WDM/TDM converter and a TDM/WDM converter to operate faster than ever.

An optical TDM multiplexer according to the invention is the apparatus to multiplex a plurality of input signals in the optical stage in the time domain, composed of a plurality of signal light sources to generate optical signals having a wavelength different from each other to carry each of the plurality of the input signals, a timing adjuster to adjust timings between the respective optical signals so that each optical signal output from the plurality of the signal light sources is disposed on a time slot different from the others in the time domain, an optical multiplexer to multiplex optical signals output from the timing adjuster in the wavelength domain, and a wavelength converter to convert each wavelength of the output light from the optical multiplexer into a predetermined wavelength.

With the above configuration, a plurality of signals at a high bit rate can be multiplexed in the time domain without using a large and expensive short pulse light source. Moreover, the stable operation can be expected.

It is possible to remove unnecessary components by disposing an optical filter to extract the light having the predetermined wavelength out of the output light from the wavelength converter.

Preferably, the wavelength converter is composed of a probe light source to generate probe light having the predetermined wavelength, a waveform superimposer applied by the output light from the probe light source and from the optical multiplexer to superimpose a signal waveform of the output light from the optical multiplexer on the probe light, and an outputter to output the probe light transmitted through the waveform superimposer. With this configuration, a wavelength of signal light as fast as 40 Gb/s is converted into a predetermined wavelength.

A WDM/TDM converter according to the invention is the apparatus to convert an optical WDM signal composed of a plurality of optical signals each having a wavelength different from the others into an optical TDM signal, composed of a timing adjuster to adjust the timings between the plurality of the optical signals so that the plurality of the optical signals each having a different wavelength from the others to compose the WDM signal are respectively disposed on a time slot different from each other in the time domain, an optical multiplexer to multiplex the respective optical signals output from the timing adjuster in the wavelength domain, and a wavelength converter to convert a wavelength of the output light from the optical multiplexer into a predetermined wavelength.

According to the above configuration, an optical WDM signal as fast as more than 10 Gb/s can be simply and inexpensively converted into an optical TDM signal. In addition, the operation is stable.

It is possible to remove unnecessary components by disposing an optical filter to extract the light having the predetermined wavelength out of the output light from the wavelength converter.

Preferably, the wavelength converter is composed of a probe light source to generate probe light having the predetermined wavelength, a waveform superimposer applied by the output light from the probe light source and from the optical multiplexer to superimpose a signal waveform of the output light from the optical multiplexer on the probe light, and an outputter to output the probe light transmitted through the waveform superimposer. According to this configuration, a wavelength of signal light as fast as 40 Gb/s can be converted into a predetermined wavelength. That is, an optical TDM signal at a bit rate of more than 40 Gb/s is easily produced.

An optical TDM demultiplexer according to the invention is the apparatus to demultiplex an optical TDM signal having n (n is an integer not less than 2) time slots into individual signals on the respective time slots, composed of a pulse light generator to generate optical pulse trains each having a wavelength different from the others at timings each belonging to a different time slot from the others, an optical multiplexer to multiplex the n optical pulses output from the pulse light generator in the wavelength domain, a waveform superimposer applied by the optical TDM signal and the output light from the optical multiplexer to superimpose a signal waveform of the optical TDM signal onto the output light from the multiplexer, and a wavelength demultiplexer to demultiplex the output light from the optical multiplexer transmitted through the waveform superimposer into respective wavelengths.

With this configuration, it is possible to demultiplex an optical TDM signal composed of optical signals as fast as 10 Gb/s or more into individual signals. In addition, it is realized with a simple and inexpensive configuration, and the operation is stable.

Preferably, the optical TDM demultiplexer is further composed of a photodetector to convert the optical signal having a predetermined wavelength output from the wavelength demultiplexer into an electric signal and a clock generator to generate a clock signal synchronized with a clock component included in the output from the photodetector, wherein the pulse light generator generates the respective optical pulse trains in synchronization with the clock output from the clock generator. With this configuration, an optical TDM signal is demultiplexed into individual signals without fail.

Preferably, the optical TDM demultiplexer is further composed of a time slot detector to detect a time slot discrimination signal out of the output from the photodetector and to adjust time slot dispositions of the respective optical pulse trains generated by the pulse light generator according to the detected result. Alternatively, the optical TDM demultiplexer is further composed of an optical delay device capable of changing delay time to delay the optical TDM signal before entering the waveform superimposer and a time slot detector to detect a time slot discrimination signal out of the output from the photodetector and to adjust the delay time of the optical delay device according to the detected result so that the optical pulse train output from the optical multiplexer and the optical TDM signal delayed by the optical delay device have predetermined phase relations. With these configurations, it is possible to determine the correspondence between a signal after TDM demultiplexing and a time slot to which the signal belongs before the demultiplexing. The latter configuration is simpler than the former.

Preferably, the optical TDM demultiplexer is further composed of a photodetector to convert the optical TDM signal into an electric signal and a clock generator to generate a clock signal at 1/n frequency synchronized with a clock component included in the output from the photodetector, wherein the pulse light generator generates the respective optical pulse trains in synchronization with the clock output from the clock generator. According to this configuration, an optical TDM signal also can be demultiplexed into individual signals without fail.

A TDM/WDM converter according to the invention is the apparatus to convert an optical TDM signal having n (n is an integer no less than 2) time slots into an optical WDM signal having n optical signals each having a different wavelength from the others, composed of a pulse light generator to generate n optical pulse trains each having a wavelength different from the others at timings each belonging to a time slot different from the others, an optical multiplexer to multiplex the n optical pulse trains output from the pulse light generator and a waveform superimposer applied by the optical TDM signal and output light from the optical multiplexer to superimpose a signal waveform of the optical TDM signal onto the output light from the multiplexer. With this configuration, optical signals on different time slots included in a high-speed optical TDM signal can be converted into optical signals each having a wavelength different from the others.

Preferably, the TDM/WDM converter is further composed of a extractor to extract signal light having a predetermined wavelength out of the output light from the optical multiplexer transmitted through the waveform superimposer, a photodetector to convert the output light from the extractor into an electric signal and a clock generator to generate a clock signal synchronized with a clock component included in the output from the photodetector. In addition, the pulse light generator generates respective optical pulse trains in synchronization with the clock output from the clock generator. According to this configuration, an optical TDM signal can be converted into an optical WDM signal without fail.

Preferably, the TDM/WDM converter is further composed of a time slot detector to detect a time slot discrimination signal out of the output from the photodetector and to adjust time slot dispositions of the respective optical pulse trains generated by the pulse light generator according to the detected result. Alternatively, the optical TDM/WDM converter is further composed of an optical delay device capable of changing delay time to delay the optical TDM signal before entering the waveform superimposer and a time slot detector to detect a time slot discrimination signal out of the output from the photodetector and to adjust the delay time of the optical delay device according to the detected result so that the optical pulse train output from the optical multiplexer and the optical TDM signal delayed by the optical delay device have predetermined phase relations. With these configurations, it is possible to determine the correspondence between a signal after TDM demultiplexing and a time slot to which the signal belongs before the demultiplexing. The latter configuration is simpler than the former.

Preferably, the TDM/WDM converter is further composed of a photodetector to convert the optical TDM signal into an electric signal and a clock generator to generate a clock signal at a 1/n frequency synchronized with a clock component included in the output from the photodetector, wherein the pulse light generator generates the respective optical pulse trains in synchronization with the clock output from the clock generator. According to this configuration, an optical TDM signal also can be demultiplexed into individual signals without fail.

BRIEF DESCRIPTION OF THE DRAWINGS

The above and other objects, features and advantages of the present invention will be apparent from the following detailed description of the preferred embodiments of the invention in conjunction with the accompanying drawings, in which.

DESCRIPTION OF THE PREFERRED EMBODIMENT

Embodiments of the invention are explained below in detail with reference to the drawings.

Figure 1:
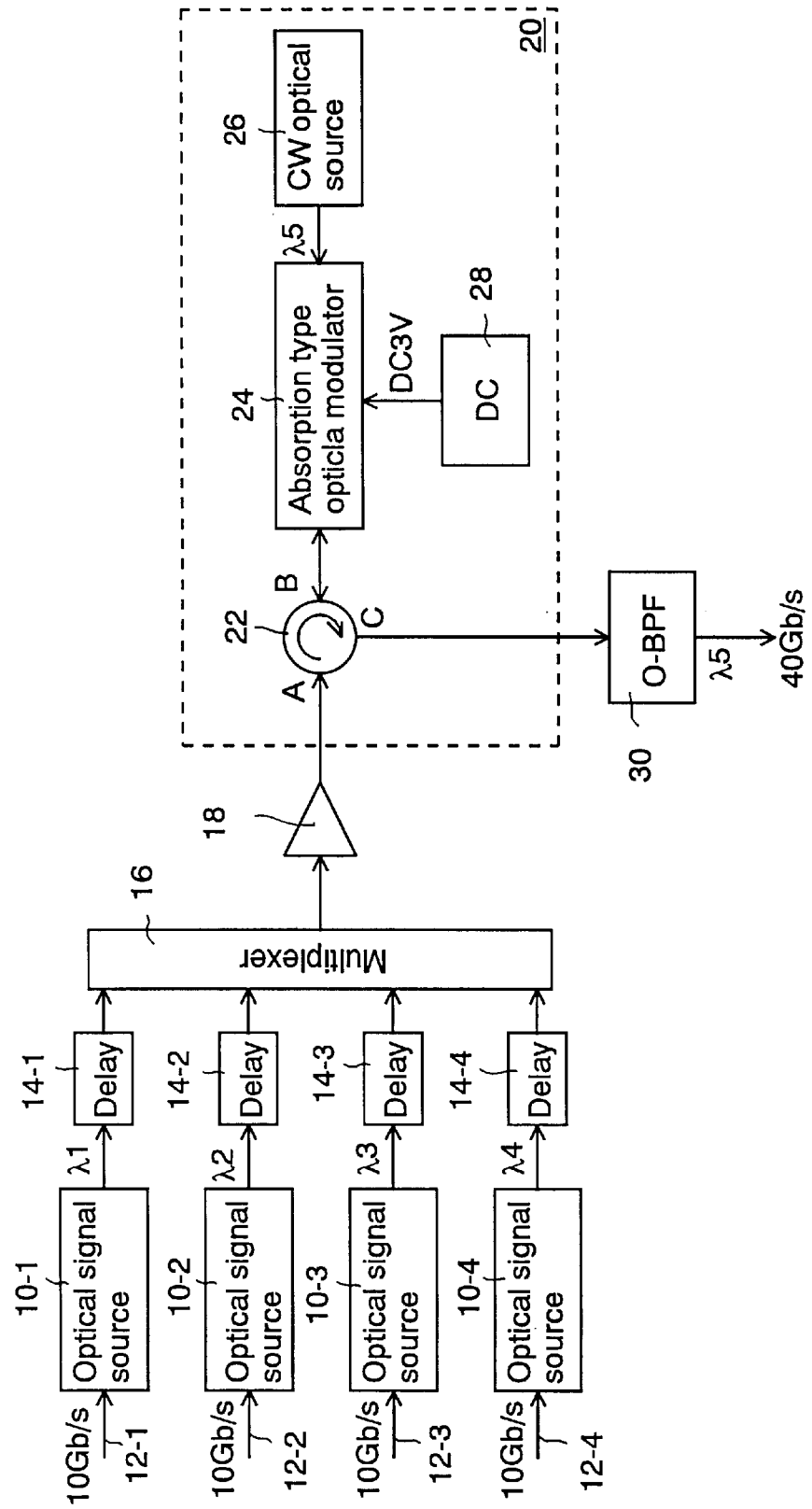
FIG. 1 shows a schematic block diagram of an embodiment of a TDM multiplexer according to the invention.
Figure 2:
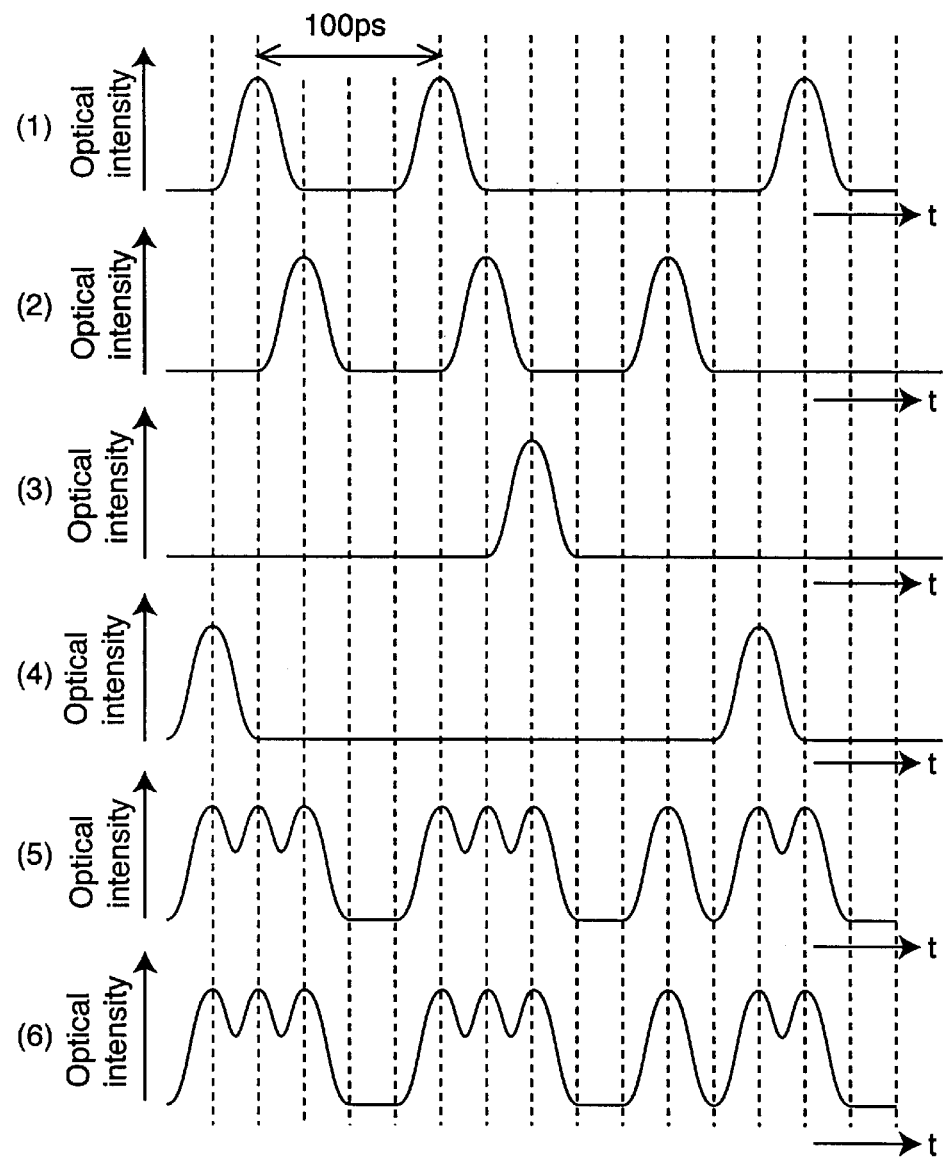
FIGS. 2(1) through (6) show waveform examples of the embodiment shown in FIG. 1.

FIG. 1 shows a schematic block diagram of an embodiment of an optical TDM multiplexer according to the invention. This embodiment is to time-division-multiplex 4 (n) signals of 10 (B) Gb/s and to generate a signal of 40 (i.e., n*B) Gb/s. FIGS. 2(1) through (6) show timing charts of the embodiment shown in FIG. 1.

Optical signal sources 10-1 through 10-4 generate RZ optical signals of 10 Gb/s having different wavelengths $\lambda 1$ through $\lambda 4$ according to data signals 12-1 through 12-4 of 10 Gb/s, respectively. Although the optical pulse width is better as narrow as possible, it is applicable as far as it fits in a time slot of 40 Gb/s after time-division-multiplexing.

Optical delay devices 14-1 through 14-4 delay the optical signals output from the respective optical signal sources 10-1 through 10-4 so as to enter predetermined different time slots of 40 Gb/s respectively. FIGS. 2(1) through (4) show waveform examples of the optical signals output from the optical delay devices 14-1 through 14-4. In other words, each delay time of the optical delay devices 14-1 through 14-4 is set so that the output light from the optical delay device 14-1 enters a first time slot, the output light from the optical delay device 14-2 enters a second time slot, the output light from the optical delay device 14-3 enters a third time slot, and the output light from the optical delay device 14-4 enters a fourth time slot in the four time slots obtained when 40 Gb/s is divided into four 10 Gb/s in the time domain. It is obvious that an electric delay device having the similar function can be disposed on each input side of the optical signal sources 10-1 through 10-4.

An optical multiplexer 16 multiplexes the respective optical signal output from the optical delay devices 14-1 through 14-4 in the wavelength domain. FIG. 2(5) shows an example of optical intensity waveform of the output light from the optical multiplexer 16. When two optical pulses exist on adjacent time slots, they are combined together and form a single pulse with a slightly depressed peak. Such combination of optical pulses does not interfere with this embodiment.

An optical amplifier 18 amplifies the output light from the optical multiplexer 16 and applies it to a wavelength converter 20. The wavelength converter 20 is a device to convert a wavelength of the input light into a wavelength $\lambda 5$, namely to generate light of the wavelength $\lambda 5$ having an essentially identical waveform (or a reverse waveform) to that of the input light. Although the wavelength of the input light and the wavelength $\lambda 5$ after the conversion can be the same, desirably they should be different to avoid the interference. Even if the input light contains light having a plurality of wavelengths, the wavelength converter 20 outputs the light of the wavelength $\lambda 5$ having a waveform according to that of the combined light intensity. The details of the wavelength converter 20 are disclosed in Japanese Laid-Open Patent Publication No. 10-78595 and U.S. Pat. No. 5,959,764 to correspond to the Japanese Laid-Open patent Publication, for instance. Accordingly, on the details of the wavelength converter 20, those references will be cited.

The output light from the optical amplifier 18 enters a port A of an optical circulator 22 and outputs from a port B to enter a waveguide transmission type InGaAsP electroabsorption optical modulator 24. A CW light source 26 generates CW laser light (probe light) of the wavelength $\lambda 5$. The CW laser light output from the CW optical source 26 enters the optical modulator 24 so as to propagate in the opposite direction to the input light from the port B of the optical circulator 22. A DC power supply 28 applies DC voltage, e.g. DC 3V, to the optical modulator 24. Although it is not shown in the drawing, an electric cooling unit is disposed to stabilize the temperature of the optical modulator 24. As described in detail in the above publication, the light (the output light from the multiplexer 16) from the port B of the optical circulator 22 and the output light from the CW light source 26 interact with each other in the optical modulator 24, and consequently the optical intensity waveform of the light having the wavelength $\lambda 5$ which is output toward the port B of the optical circulator 22 from the optical modulator 24 represents a copy of the optical intensity waveform of the output light from the multiplexer 16 as shown in FIG. 2(6).

The optical circulator 22 transmits the light that entered the port B from the optical modulator 24 to a port C and applies it to an optical bandpass filter 30 from the port C. The bandpass filter 30 is set to exclusively transmit the wavelength $\lambda 5$ alone. Unnecessary wavelength components such as components of the wavelengths $\lambda 1$ through $\lambda 4$ are removed by the optical bandpass filter 30. The output of the optical bandpass filter 30 is signal light of 40 Gb/s in which the four data 12-1 through 12-4 of 10 Gb/s are time-division-multiplexed.

The embodiment shown in FIG. 1 is also applicable to a device to convert an optical WDM signal into an optical TDM signal. For a wide use, timings between optical signals of respective wavelengths entered the optical delay device 14-1 through 14-4 is measured, and the delay time of each of the optical delay devices 14-1 through 14-4 is automatically controlled so that the optical signals are located on different time slots after the TDM respectively. Needless to say, in such case that the timings between the input optical pulses of the optical delay devices 14-1 through 14-4 are already known, the delay time of each of the optical delay devices 14-1 through 14-4 can be preset.

Figure 3:
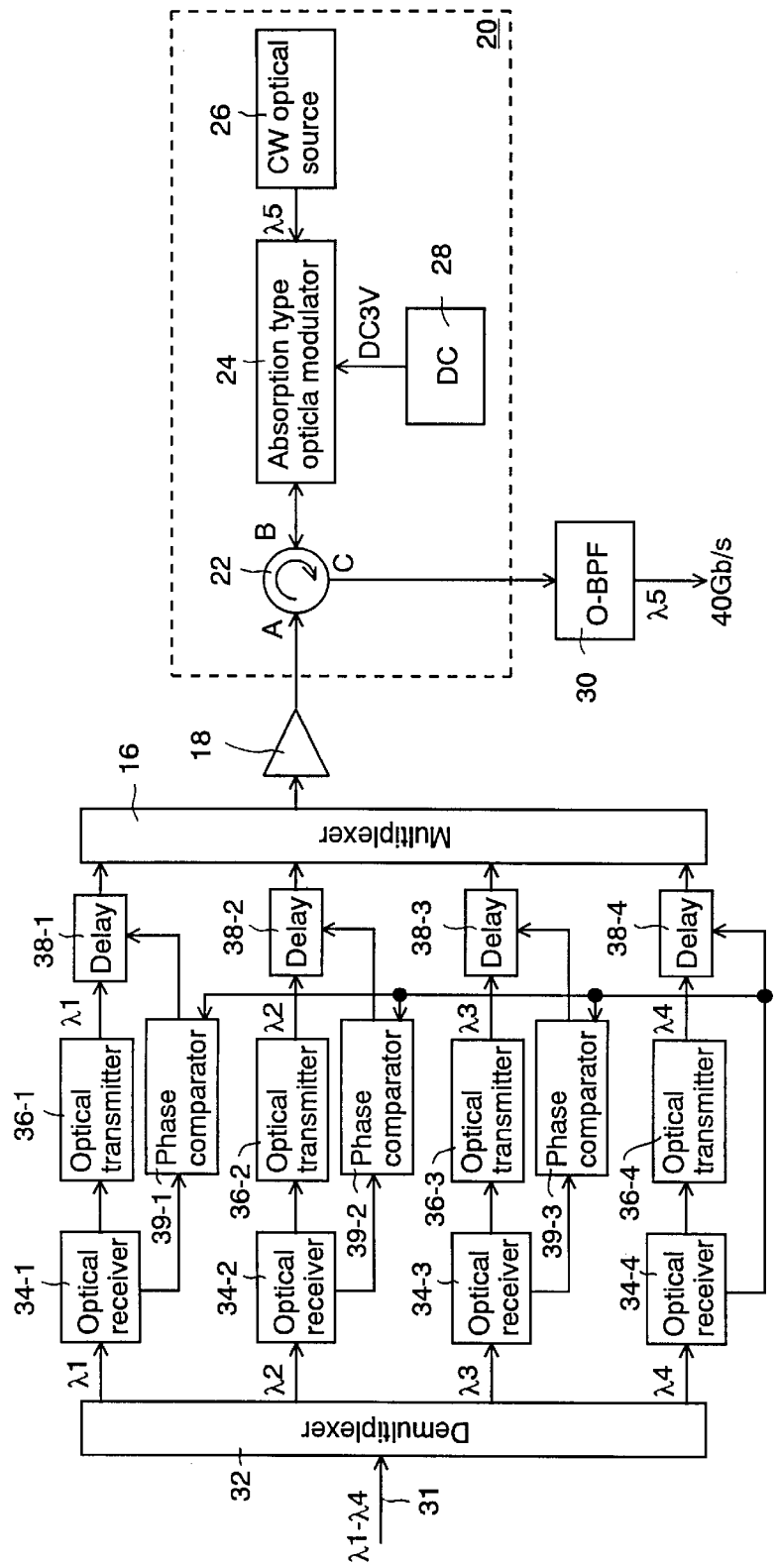
FIG. 3 shows a schematic block diagram of an embodiment as a WDM/TDM converter.

FIG. 3 shows a schematic block diagram of an embodiment to convert an optical WDM signal from an optical transmission line into an optical TDM signal. Elements identical to those in FIG. 1 are labeled with common reference numerals.

An optical WDM signal 31 composed of optical signals of 10 Gb/s having wavelengths λ1 through λ4 enters a demultiplexer 32 from an optical fiber transmission line. The demultiplexer 32 demultiplexes the optical WDM signal 31 into individual optical signals having the wavelengths λ1 through λ4 and applies them to optical receivers 34-1 through 34-4 respectively. The optical receivers 34-1 through 34-4 convert the input optical signals into electric signals and apply them to optical transmitters 36-1 through 36-4 respectively. The optical transmitters 36-1 through 36-4 convert the optical signals from the optical receivers 34-1 through 34-4 into optical signals of RZ optical pulse having wavelengths λ1 through λ4 and apply them to optical delay devices 38-1 through 38-4 respectively.

The optical receivers 34-1 through 34-4 also extract a clock component from the input signal light. The clocks extracted by the optical receivers 34-1 through 34-3 are applied to phase comparators 39-1 through 39-3 while the clocks extracted by the optical receiver 34-4 are applied to the optical delay device 38-4 and the phase comparators 39-1 through 39-3 as a reference clock. Each of the phase comparators 39-1 through 39-3 compares phase of the clock (the reference clock) from the optical receiver 34-4 to the clocks from the associated one of the optical receivers 34-1 through 34-3 and controls the delay time of the associated one of the optical delay devices 38-1 through 38-3 so that optical signals to be output from the optical transmitters 36-1 through 36-3 are respectively located on a first time slot, a second time slot and a third time slot after the time-division-multiplexing. The delay time of the optical delay device 38-4 is controlled according to the reference clock from the optical receiver 34-4 so that the signal light output from the optical transmitter 36-4 is located on a fourth time slot after the time-division-multiplexing. As stated above, by controlling the delay time of the optical delay devices 38-1 through 38-4, the optical signals output from the optical delay devices 38-1 through 38-4 are located at timings shown in FIGS. 2(1) through (4). The operation after this is the same with the explanation of the embodiment in FIG. 1 and thus TDM signal light at 40 Gb/s is finally obtained.

The optical receiver 34-1 through 34-4 and the optical transmitter 36-1 through 36-4 function as a device to shape a waveform of the signal light as a whole. Needless to say, the optical transmitter 36-1 through 36-4 can output an optical signal having a wavelength different from that of an optical signal to enter the optical receiver 34-1 through 34-4. In this point of view, the optical receiver 34-1 through 34-4 and the optical transmitter 36-1 through 36-4 function as a wavelength converter as a whole. Naturally, when such functions of the waveform shaping and waveform conversion are unnecessary, photodetectors and clock extracting circuits to extract a clock of the signal light having each wavelength should be disposed instead of the optical receiver 34-1 through 34-4 and the optical transmitter 36-1 through 36-4.

Figure 4:
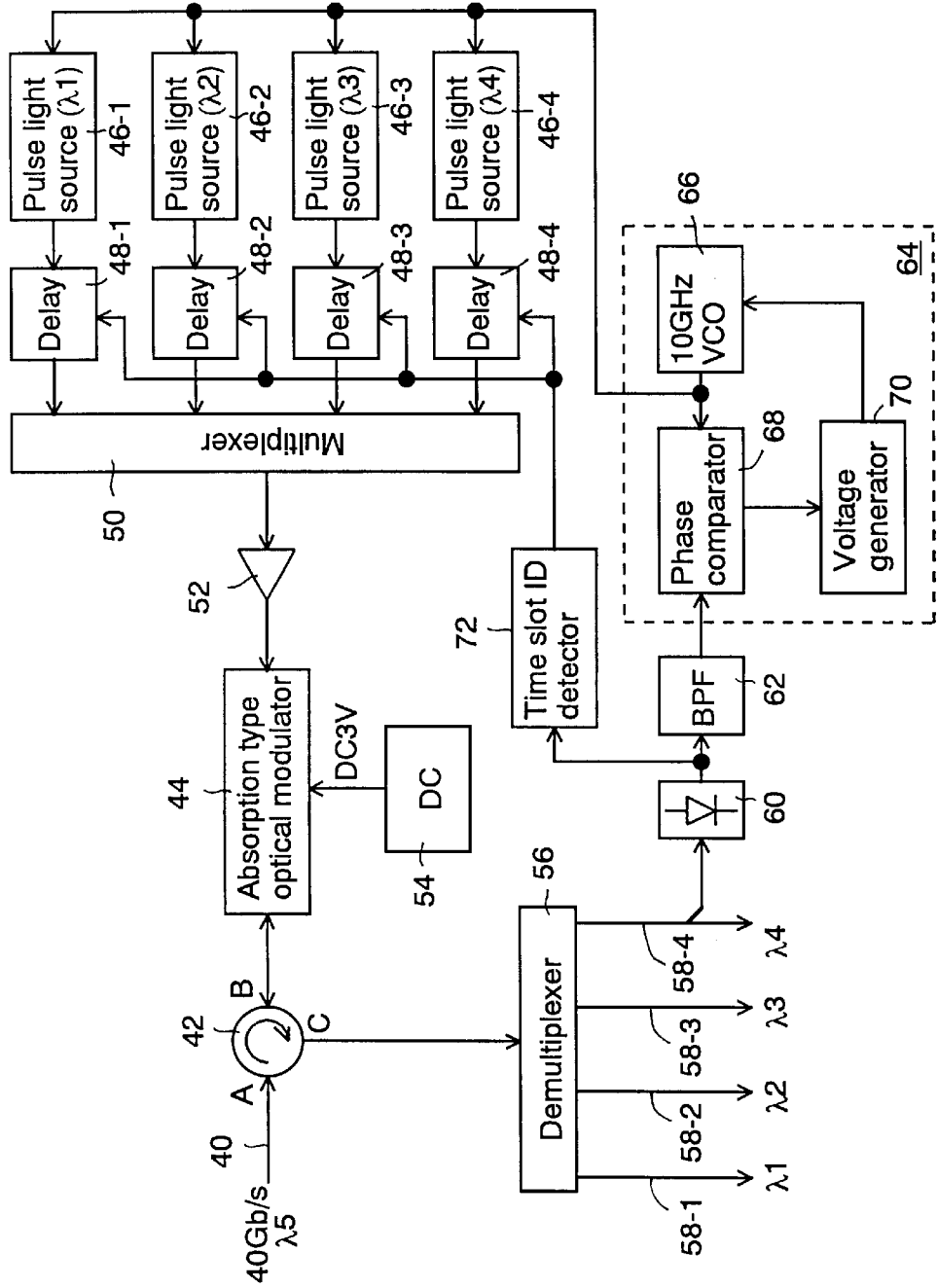
FIG. 4 shows a schematic block diagram of an embodiment of a TDM demultiplexer according to the invention.
Figure 5:
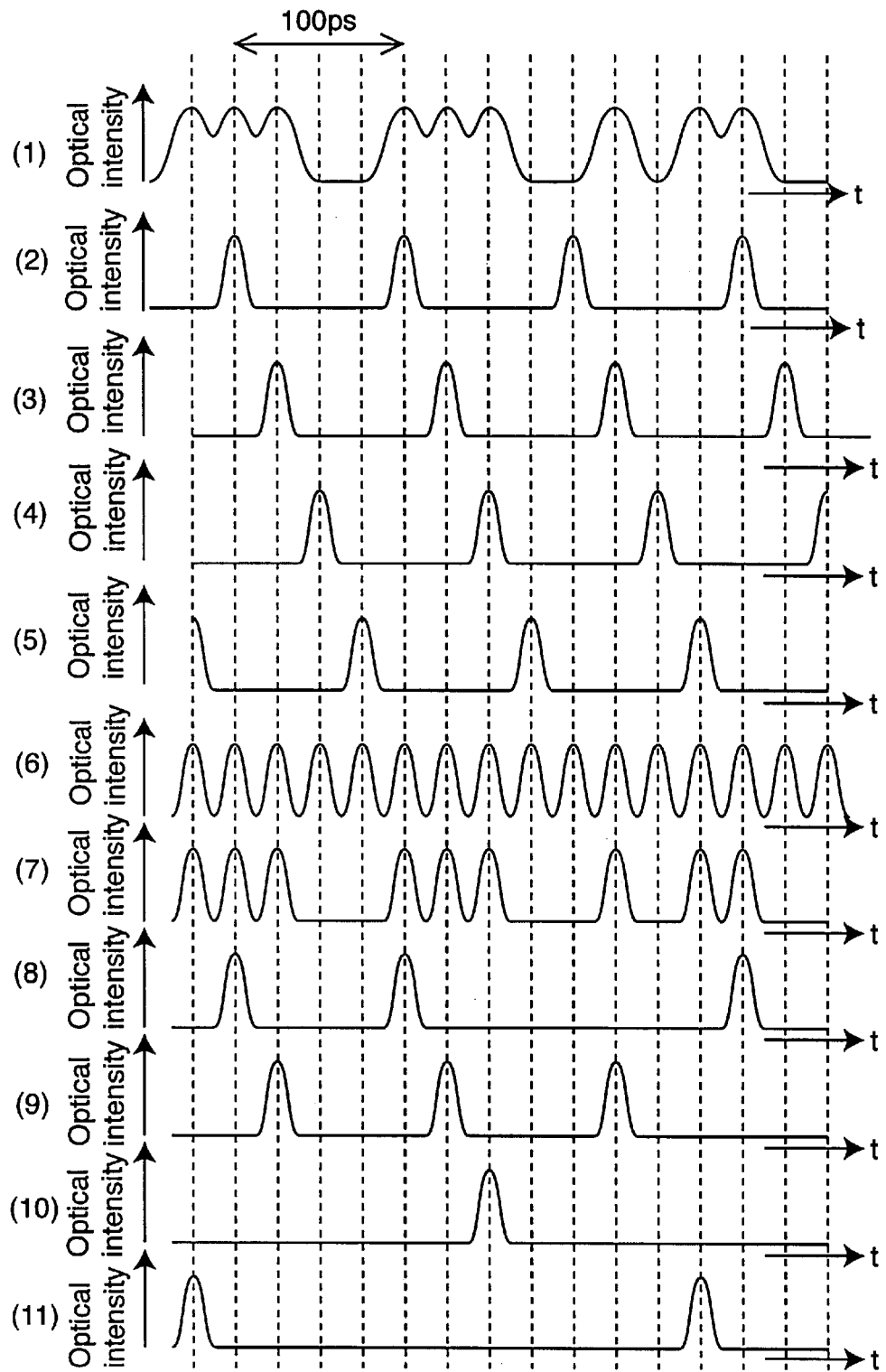
FIGS. 5(1) through (11) show waveform examples of the embodiment shown in FIG. 4.

FIG. 4 shows a schematic block diagram of an embodiment of a TDM demultiplexer according to the invention. The embodiment shown in FIG. 4 demultiplexes a signal of 40 Gb/s into respective four signals of 10 Gb/s. FIGS. 5(1) through (11) each shows an optical waveform of each part in the embodiment shown in FIG. 4.

An 40 Gb/s optical signal 40 of a single wavelength (here, λ5) entered a port A of an optical circulator 42 is transmitted to a port B and applied to a waveguide transmission type InGaAsP electroabsorption optical modulator 44 from the port B. FIG. 5(1) shows a waveform example of the input signal light 40.

Pulse light sources 46-1 through 46-4 to generate pulse light of 10 Gb/s after the TDM demultiplexing are provided as many as the number of the signals after the TDM demultiplexing and laser-oscillate at wavelengths λ1 through λ4, which are different from each other, respectively. The optical pulses output from the pulse light sources 46-1 through 46-4 are temporally adjusted in the time domain by the optical delay devices 48-1 through 48-4 respectively and applied to a multiplexer 50. Each delay time of the optical delay devices 48-1 through 48-4 is adjusted so that each optical pulse output from the pulse light sources 46-1 through 46-4 is disposed on a different time slot from the other when 40 Gb/s is divided into four time slots of 10 Gb/s. FIGS. 5(1) through (4) show waveform examples of the output light from the optical delay devices 48-1 through 48-4 respectively. The multiplexer 50 multiplexes the output light from the optical delay devices 48-1 through 48-4 in the wavelength domain. FIG. 5(6) shows a waveform example of the output light from the multiplexer 50. The output light from the multiplexer 50 is composed of pulse light of 40 Gb/s although the optical signals having the four wavelengths are periodically mixed.

It is necessary to synchronize the optical pulses output from the pulse light sources 46-1 through 46-4 with the input signal light 40. In addition, it is necessary to set the relative delay amount of the optical delay devices 48-1 through 48-4 according to the input signal light 40 in order to correspond the wavelengths λ1 through λ4 of the output light from the pulse light sources 46-1 through 46-4 and the four time slots of the input signal light 40. Means for the above operations are to be described later.

The output light from the multiplexer 50 is amplified by an optical amplifier 52 and applied to the optical modulator 44 as probe light in the opposite transmission direction to the 40 Gb/s signal light. A DC power source 54 applies a constant DC voltage to the optical modulator 44. The optical modulator 44 functions as a wavelength converter to input pulse light as probe light. The optical modulator 44, more specifically, functions as an optical AND circuit to perform an AND-operation between the input 40 Gb/s signal light 40 and the pulse train output from the optical amplifier 52 or as an optical gate circuit to selectively transmit an optical pulse included in the optical pulse train from the optical amplifier 52 according to the input signal light 40 of 40 Gb/s as a window. FIG. 5(7) shows a waveform of the light which output from the optical amplifier 53 and transmitted through the optical modulator 44. Such operation of the optical modulator 44 is described in detail with reference to FIGS. 6 through 8 in Japanese Laid-Open Patent Publication No. 10(1998)-78595 and U.S. Pat. No. 5,959,764.

The optical pulses of wavelengths λ1 through λ4 output from the optical modulator 44 are applied to the port B of the optical circulator 42, transmitted to a port c and sent to a wavelength demultiplexer 56 from the port C. The wavelength demultiplexer 56 demultiplexes the light from the port C of the optical circulator 42 into different wavelengths and outputs them. Accordingly, the wavelength demultiplexer 56 outputs 10 Gb/s optical signals 58-1 through 58-4 having the wavelengths λ1 through 4 being different from each other. FIGS. 5(8) through (11) show waveform examples of the signal light 58-1 through 58-4 respectively.

A photodetector 60 converts the optical signal 58-4 having the wavelength λ4 into an electric signal. A bandpass filter 62 extracts a clock component of 10 Gb/s out of the output from the photodetector 60 and applies it to a PLL circuit 64. The PLL circuit 64 of a well-known configuration generates a 10 GHz clock signal synchronized with the output from the BPF 62. The PLL circuit 64 is composed of, for example, a 10 GHz voltage control oscillator (VCO) 66, a comparator 68 to compare phase between the output from the BPF 62 and that from the VCO 66 and to output an error signal indicating a phase error and a voltage generator 70 to generate a voltage signal to control a oscillation frequency of the VCO 66 according to the error signal output from the comparator 68.

The 10 GHz clock generated by the PLL circuit 64 is applied to the pulse light sources 46-1 through 46-4. The pulse light sources 46-1 through 46-4 generate pulse light having a frequency equal to that of the clock from the PLL circuit 64. The pulse light sources 46-1 through 46-4 can be composed of either a mode locked laser to generate pulse light according to the clock from the PLL circuit 64 or a combination of a CW laser and an electroabsorption optical modulator to generate pulse light by modulating intensity of output light from the CW laser according to the clock from the PLL circuit 64. According to the above configuration, the pulse light sources 46-1 through 46-4 generate pulse light synchronized with the input signal light 40. However, the bit rate of the optical pulse output from each of the pulse light sources 46-1 through 46-4 is one fourth of the input signal light.

A time slot ID detector 72 detects information to identify a time slot, namely time slot ID, out of the output signal from the photodetector 60. The time slot ID, for example, is the information to show on which time slot after the TDM each signal to be multiplexed in the time domain is disposed and can be the destination of the signal. With this operation, it is determined to which time slot on the input signal light 40 the signal 58-4 should be disposed currently. The time slot ID detector 72 adjusts the delay time of the optical delay devices 48-1 through 48-4 according to the detected result so that the optical signals 58-1 through 58-4 are disposed to the first time slot, the second time slot, the third time slot and the forth time slot on the input 40 Gb/s signal light 40 respectively. When the time delay in the pulse light sources 46-1 through 46-4 is disregarded, the delay time of the optical delay devices 46-1 through 46-4 should be any one of 0, 25 ps, 50 ps and 75 ps, and the time slot ID detector 72 assigns those time to the respective optical delay devices 48-1 through 48-4 as delay time. However, it is obvious that each delay time of the optical delay devices 48-1 through 48-4 is different from the others.

When the optical signals 58-1 through 58-4 are transmitted on the same optical fiber, the demultiplexing of the wavelength by the demultiplexer 56 is unnecessary, and the output light from the port C of the optical circulator 42 is applied to the optical fiber instead. However, even in such case, an optical filter is necessary to extract the signal light having the wavelength λ4 and to apply it to the photodetector 60. As easily understandable, the embodiment shown in FIG. 4 also functions as a converter to convert an optical TDM signal into an optical WDM signal.

Figure 6:
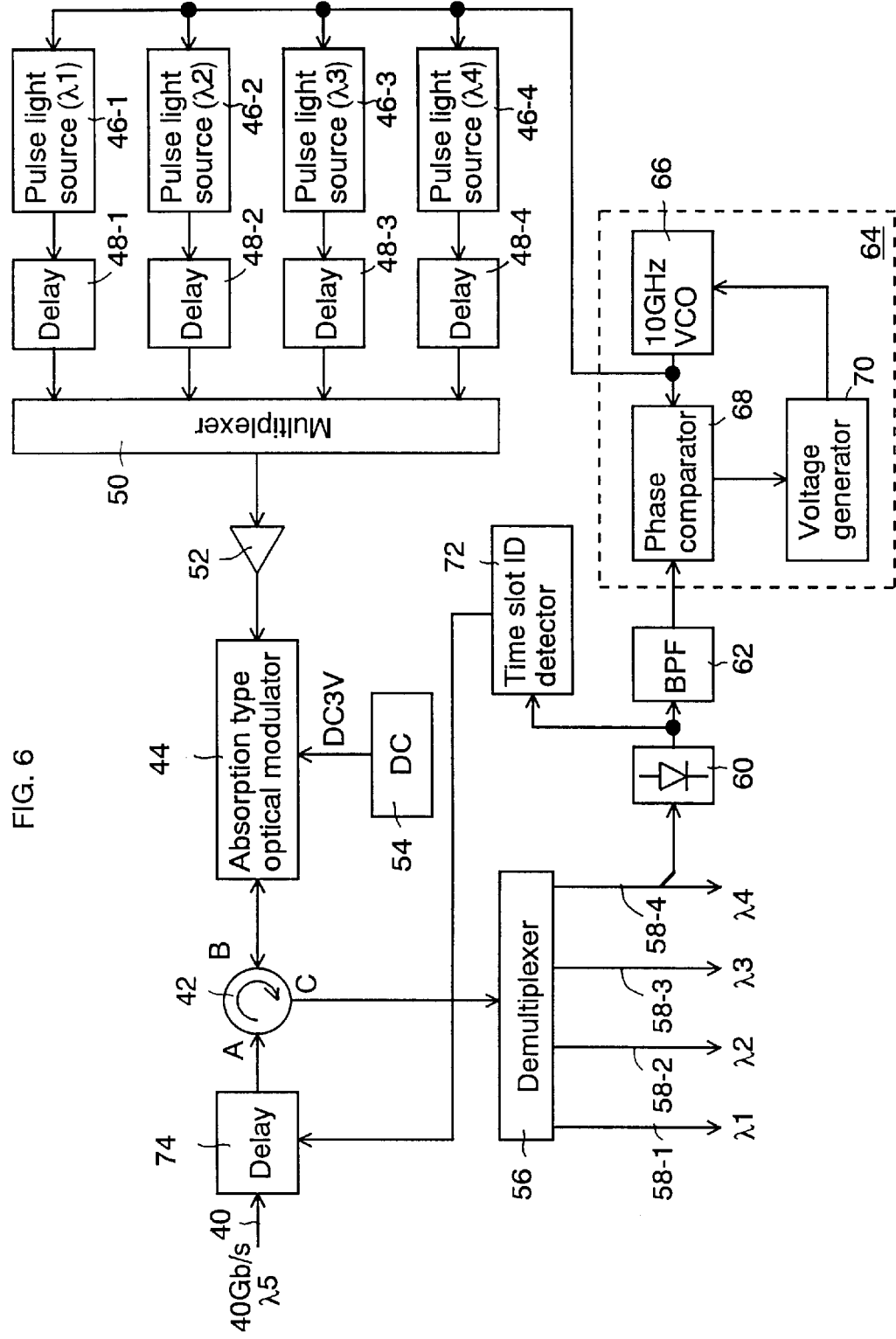
FIG. 6 shows a schematic block diagram of a modification of the embodiment shown in FIG. 4.

In the embodiment shown in FIG. 4, the optical delay devices 48-1 through 48-4 control the cross timing between the output optical pulses from the pulse light sources 46-1 through 46-4 in the time domain. However, it is also applicable that the optical pulse phase of the input signal light 40 is controlled according to the detected result of the time slot ID detector 72 while the cross delay time of the optical delay devices 48-1 through 48-4 is fixed. FIG. 6 shows a schematic block diagram of such modified embodiment. Elements common to those in FIG. 4 are numbered with the same reference numerals. However, the delay time of the optical delay devices 48-1 through 48-4 are generally fixed to 0, 25 ps, 50 ps and 50 ps respectively when uneven response delay of the pulse light sources 46-1 through 46-4 is disregarded.

In an embodiment shown in FIG. 6, the input signal light 40 enters the port A of the optical circulator 42 via an optical delay device 74 having valuable delay time. The delay time of the optical delay devices 48-1 through 48-4 are adjusted and fixed in advance. When it is possible to disregard the cross time deviation of the output optical pulses from the pulse light sources 46-1 through 46-4, the delay time of any one of the optical delay devices, for example the optical delay device 48-1, can be zero. That is, the optical delay device 48-1 can be omitted.

The time slot ID detector 72 adjusts the delay time of the optical delay device 74 according to the detected result so that the signal light 58-4 carries a signal on the fourth time slot. Consequently, the timings between the input signal light 40 and the output pulse light from the optical amplifier 52 are controlled so that the signal light 58-1 carries a signal on the first time slot on the input signal light 40, the signal light 58-2 carries a signal on the second time slot, the signal light 58-3 carries a signal on the third time slot, and the signal light 58-4 carries the signal light on the fourth slot.

Figure 7:
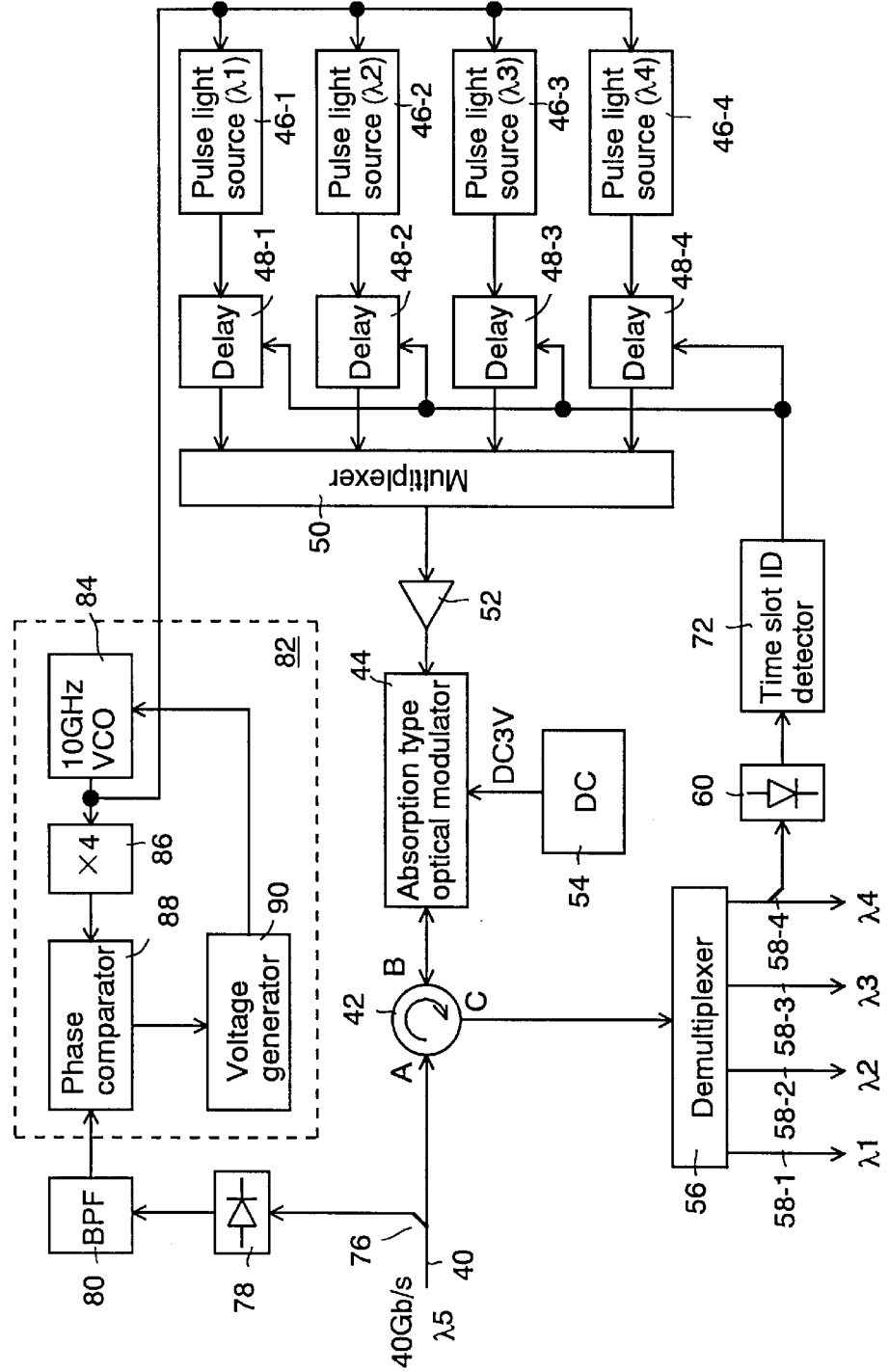
FIG. 7 shows a schematic block diagram of another modification of the embodiment shown in FIG. 4.

In FIG. 4, although the pulse light sources 46-1 through 46-4 are synchronized with the input signal light 40 using the 10 GHz clock synchronized with the signal obtained by demultiplexing a TDM signal, it is also applicable that the 10 GHz clock component is generated from the input signal light 40 and synchronized with the pulse light sources 46-1 through 46-4. FIG. 7 shows a schematic block diagram of such modified embodiment. Elements common to those in FIG. 4 are numbered with the same reference numerals.

The demultiplexer 76 divides the input signal light 40 of a 40 Gb/s TDM signal into two portions and applies one portion to the port A of the optical circulator 42 and the other to a photodetector 78. The photodetector 78 converts the input light into an electric signal. A bandpass filter 80 extracts a 40 GHz component from the output from the photodetector 78 and applies it to a ¼ frequency divider 82. The frequency divider 82 generates a 10 GHz signal synchronized with the output from the BPF 80. That is, the frequency divider 82 is composed of a 10 GHz voltage control oscillation (VCO) 84, a quadrupler 86 to quadruple output frequency of the VCO 84, a comparator 88 to compare phase between the output from the BPF 80 and that of the quadrupler 86 and to outputs a error signal indicating a phase error, and a voltage generator 90 to generate a voltage signal to control the oscillation frequency of the VCO 84 according to the error signal output from the comparator 88. With this configuration, the output from the VCO 84 is synchronized with the output from the BPF 80, namely the input signal light 40.

The 10 GHz clock output from the VCO 84 of the frequency divider 82 is applied to the pulse light sources 46-1 through 46-4. The pulse light sources 46-1 through 46-4 generate pulse light having the same frequency with the clock from the frequency divider 82. The operation after this is identical to the description of the embodiment shown in FIG. 4.

Obviously, such modification shown in FIG. 6 is also applicable to the modified embodiment shown in FIG. 7.

That is, an optical delay device with variable delay time is disposed immediately before the demultiplexer 76, and the delay time is controlled according to a detected result of the time slot ID detector 72.

As described above, a signal of 40 Gb/s is demultiplexed into four signals of 10 Gb/s. Since the optical pulse width of the pulse light sources 46-1 through 46-4 is not necessarily as narrow as that of the conventional art, it can be realized with low costs. By increasing the number of the pulse light sources 46-1 through 46-4, an optical TDM signal at even higher speed can be demultiplexed into a plurality of signals in the time domain.

While the invention has been described with reference to a specific embodiment, it will be apparent to those skilled in the art that various changes and modifications can be made to the specific embodiment without departing from the spirit and scope of the invention as defined in the claims.

As is readily understandable from the aforementioned description, according to the invention, a plurality of signals can be multiplexed in the time domain with a simple configuration. In addition, a signal at a high speed can be demultiplexed into a plurality of signals at a low speed in the time domain.

What is claimed is:

1. An optical TDM multiplexing apparatus to multiplex a plurality of input signals in optical stage in time domain, comprising:
   a plurality of n signal light sources to generate n optical signals, each optical signal having a wavelength different from wavelengths of other optical signals to carry each of the plurality of the input signals and each optical signal having same bit rate B, wherein n is greater than or equal to 2;
   a timing adjuster to adjust timings between the optical signals so that each optical signal is disposed in a time slot different from time slots of other optical signals and having a bit rate of n*B in time domain;
   an optical multiplexer to multiplex each adjusted optical signal output from the timing adjuster in wavelength domain; and
   a wavelength converter to convert each wavelength of multiplexed optical signals output from the optical multiplexer into a predetermined wavelength.

2. The optical TDM multiplexing apparatus of claim 1 further comprising an optical filter to extract light having the predetermined wavelength out of converted optical signals output from the wavelength converter.

3. The optical TDM multiplexing apparatus of claim 1 wherein the wavelength converter comprises a probe light source to generate a probe light having the predetermined wavelength, a waveform superimposer applied by the output light from the probe light source and from the optical multiplexer to superimpose a signal waveform of the multiplexed optical signals output from the optical multiplexer onto the probe light, and an outputter to output the probe light transmitted through the waveform superimposer.

4. A WDM/TDM converter to convert an optical WDM signal composed of n optical signals each having a wavelength different from the others and having same bit rate B into an optical TDM signal, comprising:
   a timing adjuster to adjust timings between the plurality of the optical signals so that each of the n optical signals is disposed in a different time slot and having a bit rate of n*B in time domain;
   an optical multiplexer to multiplex each signal light output from the timing adjuster in wavelength domain; and
   a wavelength converter to convert a wavelength of the output light from the optical multiplexer into a predetermined wavelength.

5. The WDM/TDM converter of claim 4 further comprising an optical filter to extract light having the predetermined wavelength out of converted optical signals output from the wavelength converter.

6. The WDM/TDM converter of claim 4 wherein the wavelength converter comprises a probe light source to generate a probe light having the predetermined wavelength, a waveform superimposer applied by the output light from the probe light source and from the optical multiplexer to superimpose a signal waveform of the output light from the optical multiplexer onto the probe light, and an outputter to output the probe light transmitted through the waveform superimposer.

7. An optical TDM demultiplexer to demultiplex an optical TDM signal with bit rate n*B, wherein n is greater than or equal to 2, comprising:
   a pulse light generator to generate n optical pulse trains of frequency B, each having a different wavelength from the others and each belonging to a different time slot and having bit rate of n*B in time domain;
   an optical multiplexer to multiplex the n optical pulse trains;
   a waveform superimposer applied by the optical TDM signal and multiplexed optical signals output from the optical multiplexer to superimpose a signal waveform of the optical TDM signal onto the multiplexed optical signals; and
   a wavelength demultiplexer to demultiplex the multiplexed optical signals output from the optical multiplexer transmitted through the waveform superimposer into respective wavelengths.

8. The optical TDM demultiplexer of claim 7 wherein the pulse light generator comprises n pulse light sources to generate n optical pulses each having a different wavelength and a timing adjuster to adjust timings between the n optical pulses so that each optical pulse belongs to a different time slot.

9. An optical TDM demultiplexer to demultiplex an optical TDM signal comprising:
   a pulse light generator to generate n optical pulse trains, each having a different wavelength from the others and each belonging to a different time slot;
   an optical multiplexer to multiplex the n optical pulse trains;
   a waveform superimposer applied by the optical TDM signal and multiplexed output light from the optical multiplexer to superimpose a signal waveform of the optical TDM signal onto the multiplexed optical signals output from the multiplexer;
   a wavelength demultiplexer to demultiplex the multiplexed optical signals output from the optical multiplexer transmitted through the waveform superimposer into respective wavelengths;
   a photodetector to convert an optical signal having a predetermined wavelength output from the wavelength demultiplexer into an electric signal; and
   a clock generator to generate a clock signal synchronized with a clock component included in photodetector output signal, wherein the pulse light generator generates each of the n optical pulse trains in synchronization with the clock output from the clock generator.

10. The optical TDM demultiplexer of claim 9 further comprising a time slot detector to detect a time slot discrimination signal out of the photodetector output signal and to adjust time slot dispositions of each of the n optical pulse trains according to the detected result.

11. The optical TDM demultiplexer of claim 9 further comprising an optical delay device having variable delay time to delay the optical TDM signal before entering the waveform superimposer; and a time slot detector to detect a time slot discrimination signal out of the photodetector output signal and to adjust the delay time of the optical delay device according to the detected time slot discrimination signal so that the multiplexed optical pulse train and the optical TDM signal delayed by the optical delay device have predetermined phase relations.

12. An optical TDM demultiplexer to demultiplex an optical TDM signal comprising:
   a pulse light generator to generate n optical pulse trains, each having a different wavelength from the others and each belonging to a different time slot;
   an optical multiplexer to multiplex the n optical pulse trains;
   a waveform superimposer applied by the optical TDM signal and multiplexed output light from the optical multiplexer to superimpose a signal waveform of the optical TDM signal onto the multiplexed output light from the multiplexer;
   a wavelength demultiplexer to demultiplex the multiplexed output light from the optical multiplexer transmitted through the waveform superimposer into respective wavelengths;
   a photodetector to convert the optical TDM signal into an electric signal; and
   a clock generator to generate a clock signal at a 1/n frequency synchronized with a clock component included in the electric signal output from the photodetector, wherein the pulse light generator generates the respective optical pulse trains in synchronization with the clock signal output from the clock generator.

13. The optical TDM demultiplexer of claim 12 further comprising a photodetector to convert the optical signal having a predetermined wavelength output from the wavelength demultiplexer into an electric signal; and a time slot detector to detect a time slot discrimination signal out of the electric signal output from the photodetector and to adjust time slot dispositions for each of the n optical pulse trains according to the detected result.

14. The optical TDM demultiplexer of claim 12 further comprising an optical delay device having variable delay time to delay the optical TDM signal before entering the waveform superimposer and a time slot detector to detect a time slot discrimination signal out of the electric signal output from the photodetector and to adjust the delay time of the delay device according to the detected discrimination signal so that the multiplexed optical pulse train output and the optical TDM signal delayed by the optical delay device have predetermined phase relations.

15. A TDM/WDM converter to convert an optical TDM signal having a bit rate of B*n, wherein n is greater than or equal to 2 into an optical WDM signal having n optical signals each having a different wavelength and same bit rate B, comprising:
   a pulse light generator to generate n optical pulse trains, each of frequency B, and each having a different wavelength and belonging to a different time slot of a bit rate of n*B in time domain;
   an optical multiplexer to multiplex the n optical pulse trains; and
   a waveform superimposer applied by the optical TDM signal having a bit rate of B*n and the multiplexed output light from the optical multiplexer to superimpose a signal waveform of the optical TDM signal on the multiplexed output light.

16. The TDM/WDM converter of claim 15 wherein the pulse light generator comprises n pulse light sources to generate n optical pulse trains each having a different wavelength from the others and a timing adjuster to adjust timings between respective n optical pulse trains so that each of the n optical pulse trains belongs to a different time slot.

17. A TDM/WDM converter to convert an optical TDM signal having n time slots into an optical WDM signal having n optical signals each having a different wavelength, wherein n is a integer no less than 2, comprising:
   a pulse light generator to generate n optical pulse trains, each having a different wavelength and belonging to a different time slot;
   an optical multiplexer to multiplex the n optical pulse trains;
   a waveform superimposer applied by the optical TDM signal and the multiplexed output light from the optical multiplexer to superimpose a signal waveform of the optical TDM signal on the multiplexed output light;
   an extractor to extract signal light having a predetermined wavelength out of the multiplexed output light transmitted through the waveform superimposer, a photodetector to convert the optical signal output from the extractor into an electric signal; and
   a clock generator to generate a clock signal synchronized with a clock component included in the electric signal output from the photodetector, wherein the pulse light generator generates respective optical pulse trains in synchronization with the clock signal output from the clock generator.

18. The TDM/WDM converter of claim 17 further comprising a time slot detector to detect a time slot discrimination signal out of the electric signal output from the photodetector and to adjust time slot dispositions of the respective optical pulse trains according to the detected result.

19. The TDM/WDM converter of claim 17 further comprising an optical delay device having variable delay time to delay the optical TDM signal before entering the waveform superimposer and a time slot detector to detect a time slot discrimination signal out of the electric signal output from the photodetector and to adjust the delay time of the optical delay device according to the detected time slot discrimination signal so that the multiplexed optical pulse train and the optical TDM signal delayed by the optical delay device have predetermined phase relations.

20. A TDM/WDM converter to convert an optical TDM signal having n time slots into an optical WDM signal having n optical signals each having a different wavelength, wherein n is a integer no less than 2, comprising:
   a pulse light generator to generate n optical pulse trains, each having a different wavelength and belonging to a different time slot;
   an optical multiplexer to multiplex the n optical pulse trains;
   a waveform superimposer applied by the optical TDM signal and the multiplexed output light from the optical multiplexer to superimpose a signal waveform of the optical TDM signal on the multiplexed output light; and
   a photodetector to convert the optical TDM signal into an electric signal and a clock generator to generate a clock signal at a 1/n frequency synchronized with a clock component included in the electric signal output from the photodetector, wherein the pulse light generator generates respective optical pulse trains in synchronization with the clock signal output from the clock generator.

21. The TDM/WDM converter of claim 20 further comprising an extractor to extract signal light having a predetermined wavelength out of the multiplexed output light transmitted through the waveform superimposer, a photodetector to convert the extracted output signal from the extractor into an electric signal and a time slot detector to detect a time slot discrimination signal out of the electric signal output from the photodetector and to adjust time slot dispositions of the respective optical pulse trains according to the detected result.

22. The TDM/WDM converter of claim 20 further comprising an optical delay device having variable delay time to delay the optical TDM signal before entering the waveform superimposer and a time slot detector to detect a time slot discrimination signal out of the electric signal output from the photodetector and to adjust the delay time of the optical delay device according to the detected time slot discrimination signal so that the multiplexed optical pulse train output from the optical multiplexer and the optical TDM signal delayed by the optical delay device have predetermined phase relations.

23. An optical Time Division Multiplexing (TDM) apparatus to multiplex n input signals having same bit rate B in a time domain, where n is greater than or equal to 2, comprising:

n signal light sources each configured to generate an optical signal corresponding to respective input signals, wherein each optical signal comprises a different wavelength;

an optical delay device configured to adjust timing of each of the optical signals output from the n signal light sources, such that each of the optical signals is allocated to a different time slot having a bit rate of n*B;

an optical multiplexer configured to multiplex the optical signals from the optical delay device based on the wavelength of the optical signals; and a wavelength converter configured to convert the wavelength of each of the optical signals output by the multiplexer to a predetermined wavelength.

24. The optical TDM multiplexing apparatus of claim 23, further comprising an optical filter configured to extract light having the predetermined wavelength from the optical signals output by the wavelength converter.

25. The optical TDM multiplexing apparatus of claim 23, wherein the wavelength converter comprises:

a probe light source configured to generate light having the predetermined wavelength;

a waveform modulator configured to process the light from the probe light source and the optical signals from the optical multiplexer by superimposing a signal waveform of the optical signals from the optical multiplexer onto the light from the probe light source, and an output port configured to provide the light transmitted through the waveform modulator.

26. A Wavelength Division Multiplexing/Time Division Multiplexing (WDM/TDM) converter to convert an optical WDM signal including n optical signals having same bit rate B, each of the optical signals having a different wavelength, into an optical TDM signal, where n is greater than or equal to 2, comprising:

an optical delay device configured to adjust timing of the n optical signals so that each of the optical signals is allocated to a different time slot of a bit rate of n*B in time domain;

an optical multiplexer configured to multiplex each of the optical signals output from the optical delay device in the wavelength domain; and a wavelength converter configured to convert a wavelength of each of the optical signals from the optical multiplexer to a predetermined wavelength.

27. The WDM/TDM converter of claim 26, further comprising an optical filter configured to extract light having the predetermined wavelength from the optical signals output by the wavelength converter.

28. The WDM/TDM converter of claim 26, wherein the wavelength converter comprises:

a probe light source configured to generate light having the predetermined wavelength;

a waveform modulator configured to process the light from the probe light source and the optical signals from the optical multiplexer by superimposing a signal waveform of the optical signals from the optical multiplexer onto the light from the probe light source; and an output port to configured to provide the probe light transmitted through the waveform modulator.

29. An optical Time Division Multiplexing (TDM) demultiplexer to demultiplex an optical TDM signal having n time slots, wherein n is greater than or equal to 2, into individual signals allocated to respective time slots each time slot having a bit rate B, comprising:

a pulse light generator configured to provide n optical pulse trains each having same frequency B, each pulse train having a different wavelength and allocated to a different time slot of a bit rate of n*B in time domain;

an optical multiplexer configured to multiplex the n optical pulse trains output by the pulse light generator in the wavelength domain;

a waveform modulator configured to process the optical TDM signal and the output signals from the optical multiplexer by superimposing a signal waveform of the optical TDM signal onto the optical pulse trains output by the optical multiplexer; and a wavelength demultiplexer configured to demultiplex the optical pulse trains output by the optical multiplexer and transmitted through the waveform modulator into respective wavelengths.

30. The optical TDM demultiplexer of claim 29, wherein the pulse light generator comprises:

a number n pulse light sources configured to generate optical pulses, each of the optical pulses having a different wavelength; and an optical delay device configured to adjust timing between each of the optical pulses from the n pulse light sources resulting in each of the optical pulses being allocated to a different time slot.

31. An optical Time Division Multiplexing (TDM) demultiplexer to demultiplex an optical TDM signal having n time slots, wherein n is greater than or equal to 2, into individual signals allocated to respective time slots, comprising:

a pulse light generator configured to provide n optical pulse trains, each pulse train having a different wavelength and allocated to a different time slot;

an optical multiplexer configured to multiplex the n optical pulse trains output by the pulse light generator in the wavelength domain;

a waveform modulator configured to process the optical TDM signal and the output signals from the optical multiplexer by superimposing a signal waveform of the optical TDM signal onto the optical pulse trains output by the optical multiplexer;

a wavelength demultiplexer configured to demultiplex the optical pulse trains output by the optical multiplexer and transmitted through the waveform modulator into respective wavelengths;

a photodetector configured to convert the optical signal having a predetermined wavelength output from the wavelength demultiplexer into an electric signal; and a clock generator configured to provide a clock signal synchronized with a clock component of the photodetector output, wherein the pulse light generator provides the respective optical pulse trains in synchronization with the clock output from the clock generator.

32. The optical TDM demultiplexer of claim 31, further comprising a time slot detector configured to detect a time slot discrimination signal from the photodetector output and to adjust time slot dispositions of the respective optical pulse trains according to the detected signal.

33. The optical TDM demultiplexer of claim 31, further comprising:

an optical delay device capable of providing a variable delay time, wherein the optical delay device is configured to delay the optical TDM signal before entering the waveform modulator; and a time slot detector configured to detect a time slot discrimination signal from the photodetector output, and to adjust the delay time of the optical delay device according to the detected signal resulting in predetermined phase relationships between the optical pulse train from the optical multiplexer and the optical TDM signal delayed by the optical delay device.

34. The An optical Time Division Multiplexing (TDM) demultiplexer to demultiplex an optical TDM signal having n time slots, wherein n is greater than or equal to 2, into individual signals allocated to respective time slots, comprising:

a pulse light generator configured to provide n optical pulse trains, each pulse train having a different wavelength and allocated to a different time slot;

an optical multiplexer configured to multiplex the n optical pulse trains output by the pulse light generator in the wavelength domain;

a waveform modulator configured to process the optical TDM signal and the output signals from the optical multiplexer by superimposing a signal waveform of the optical TDM signal onto the optical pulse trains output by the optical multiplexer;

a wavelength demultiplexer configured to demultiplex the optical pulse trains output by the optical multiplexer and transmitted through the waveform modulator into respective wavelengths;

a photodetector configured to convert the optical TDM signal into an electric signal; and a clock generator configured to provide a clock signal at a 1/n frequency synchronized with a clock component of the photodetector output, wherein the pulse light generator provides the respective optical pulse trains in synchronization with the clock output of the clock generator.

35. The optical TDM demultiplexer of claim 34, further comprising:

a photodetector configured to convert the optical signal having a predetermined wavelength into an electric signal; and a time slot detector configured to detect a time slot discrimination signal from the photodetector output and to adjust time slot dispositions of the respective optical pulse trains generated by the pulse light generator according to the detected signal.

36. The optical TDM demultiplexer of claim 34, further comprising:

an optical delay device capable of providing a variable delay time to delay the optical TDM signal before being provided to the waveform modulator, and a time slot detector configured to detect a time slot discrimination signal from the photodetector output and to adjust the delay time of the optical delay device according to the detected signal resulting in predetermined phase relationships between the optical pulse train output from the optical multiplexer and the optical TDM signal delayed by the optical delay device.

37. A Time Division Multiplexing/Wavelength Division Multiplexing (TDM/WDM) converter to convert an optical TDM signal having n time slots, wherein n is greater than or equal to 2, into an optical WDM signal having n optical signals, each time slot having same bit rate B and each of the n optical signals having different wavelength, comprising:

a pulse light generator configured to generate n optical pulse trains, each of frequency B, each of the optical pulse trains having a different wavelength and allocated to a different time slot of a bit rate of n*B in time domain;

an optical multiplexer configured to multiplex the n optical pulse trains; and a waveform modulator configured to process the optical TDM signal and multiplexed optical pulse trains from the optical multiplexer by superimposing a signal waveform of the optical TDM signal on the multiplexed pulse trains.

38. The TDM/WDM converter of claim 37, wherein the pulse light generator comprises n pulse light sources configured to provide optical pulse trains, each of the optical pulse trains having a different wavelength; and a delay circuit configured to adjust timing between the respective optical pulse trains output from the n pulse light sources, wherein each of the optical pulse trains is allocated to a different time slot.

39. A Time Division Multiplexing/Wavelength Division Multiplexing (TDM/WDM) converter to convert an optical TDM signal having n time slots, wherein n is greater than or equal to 2, into an optical WDM signal having n optical signals, each of the n optical signals having different wavelength, comprising:

a pulse light generator configured to generate n optical pulse trains, each of the optical pulse trains having a different wavelength and allocated to a different time slot;

an optical multiplexer configured to multiplex the n optical pulse trains; and a waveform modulator configured to process the optical TDM signal and multiplexed optical pulse trains from the optical multiplexer by superimposing a signal waveform of the optical TDM signal on the multiplexed pulse trains;

an extractor configured to select optical pulse trains having a predetermined wavelength transmitted from the optical multiplexer through the waveform modulator;

a photodetector configured to convert an optical signal output from the extractor into an electric signal; and a clock generator configured to provide a clock signal synchronized with a clock component of the photodetector output, wherein the pulse light generator configured to provide respective optical pulse trains in synchronization with a clock output of the clock generator.

40. The TDM/WDM converter of claim 39, further comprising a time slot detector configured to detect a time slot discrimination signal from the photodetector output and to adjust time slot dispositions of the respective optical pulse trains according to the detected signal.

41. The TDM/WDM converter of claim 39, further comprising:

an optical delay device capable of providing a variable delay time and configured to delay the optical TDM signal before entering the waveform modulator; and a time slot detector configured to detect a time slot discrimination signal from the photodetector output, and to adjust the delay time of the optical delay device according to the detected signal resulting in a predetermined phase relationship between the optical pulse train from the optical multiplexer and the optical TDM signal delayed by the optical delay device.

42. A Time Division Multiplexing/Wavelength Division Multiplexing (TDM/WDM) converter to convert an optical TDM signal having n time slots, wherein n is greater than or equal to 2, into an optical WDM signal having n optical signals, each of the n optical signals having different wavelength, comprising:

a pulse light generator configured to generate n optical pulse trains, each of the optical pulse trains having a different wavelength and allocated to a different time slot;

an optical multiplexer configured to multiplex the n optical pulse trains; and a waveform modulator configured to process the optical TDM signal and multiplexed optical pulse trains from the optical multiplexer by superimposing a signal waveform of the optical TDM signal on the multiplexed pulse trains;

a photodetector configured to convert the optical TDM signal into an electric signal; and a clock generator configured to provide a clock signal at a 1/n frequency synchronized with a clock component of the photodetector output, wherein the pulse light generator provides the respective optical pulse trains in synchronization with the clock output of the clock generator.

43. The TDM/WDM converter of claim 42, further comprising:

an extractor configured to select optical pulse trains having a predetermined wavelength transmitted from the optical multiplexer through the waveform modulator;

a photodetector configured to convert an output of the extractor into an electric signal; and a time slot detector configured to detect a time slot discrimination signal from the photodetector output and to adjust time slot dispositions of the respective optical pulse trains generated by the pulse light generator according to the detected signal.

44. The TDM/WDM converter of claim 42, further comprising:

an optical delay device capable of variable delay time, wherein the optical delay device is configured to delay the optical TDM signal before entering the waveform modulator; and a time slot detector configured to detect a time slot discrimination signal from the photodetector output and to adjust the delay time of the optical delay device according to the detected signal resulting in predetermined phase relationships between the optical pulse train output from the optical multiplexer and the optical TDM signal delayed by the optical delay device.

* * * * *